(12) United States Patent
Eguchi

(10) Patent No.: US 6,886,946 B2
(45) Date of Patent: May 3, 2005

(54) PROJECTION TYPE IMAGE DISPLAY APPARATUS AND IMAGE DISPLAY SYSTEM

(75) Inventor: Masaharu Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/661,876

(22) Filed: Sep. 11, 2003

(65) Prior Publication Data

US 2005/0001999 A1 Jan. 6, 2005

(30) Foreign Application Priority Data

Sep. 11, 2002 (JP) ........................................ 2002-265297

(51) Int. Cl.[7] .......................... G03B 21/10; G03B 3/00; G03B 21/26; G02B 21/14
(52) U.S. Cl. ............................ 353/101; 353/30; 353/70
(58) Field of Search ........................... 353/30, 70, 101; 348/745, 806; 349/5, 7, 9; 352/140

(56) References Cited

U.S. PATENT DOCUMENTS 6,592,228 B1 * 7/2003 Kawashima et al. ........ 353/101
2004/0046943 A1 * 3/2004 Muramatsu ................... 353/70

FOREIGN PATENT DOCUMENTS

| JP | 3120526 | 7/1993 | ............. G02F/7/32 |
| JP | 3199048 | 9/1999 | ............. G02F/1/13 |

* cited by examiner

Primary Examiner—Rodney Fuller
Assistant Examiner—Melissa J Koval
(74) Attorney, Agent, or Firm—Morgan & Finnegan LLP (57) ABSTRACT

A projection type image display apparatus capable of achieving accurate focusing of a projection optical system using an output from a photoreception sensor, is disclosed. The projection type image display apparatus includes a projection optical system and performs focusing control of the projection optical system based on an output signal from an photoreception sensor. The photoreception sensor receives light from the projection surface. The optical axis of the projection optical system is shifted with respect to a reference axis. The reference axis leads from the center of an original image formed on an image forming element to the center of the projected image. The photoreception sensor receives light from a detection area which is proximate to and includes the position of the optical axis of the projection optical system on the projection surface.

15 Claims, 6 Drawing Sheets

PROJECTION TYPE IMAGE DISPLAY APPARATUS AND IMAGE DISPLAY SYSTEM

BACKGROUND OF THE INVENTION

1. Field of the Invention

The present invention relates to a projection type image display apparatus such as a projector, and more particularly, to a projection type image display apparatus that allows autofocusing of a projection optical system.

2. Description of the Related Art

With regard to a projector, the center of a screen is generally not aligned with the optical axis of a projection lens considering that it is often the case that light is emitted from the projector on a desk onto the screen which is located a little higher than the desk. In this case, the position of the optical axis is shifted close to the bottom of the screen with respect to the center of the projection screen, which prevents trapezoidal distortion of the projected image and allows projection with an angle of elevation.

On the other hand, there is a projector which automatically performs focusing of a projection lens. In this case, a so-called passive AF (Auto Focus) using a two-image correlation or a so-called active AF, which emits infrared light onto a screen, receives the reflected light by a photoreception element and measures a distance from the photoreception output, is often used.

For example, in Japanese Patent No. 3,120,526, the passive AF is disclosed. The projector uses two optical systems aside from a projection lens which are separated in the length direction of a base line and photoreception sensors made up of photoelectric conversion elements for the respective optical systems. Then, a chart image is projected onto the center of the screen, the reflected light from the image pattern is received by a photoreception sensor to thereby obtain a parallax image signal and achieve focusing.

On the other hand, Japanese Patent No. 3,199,048 discloses an active AF. This projector projects infrared rays from an emission element onto the center of a screen and receives the reflected light by a photoreception sensor. Then, the focus lens is moved based on the photoreception output of the photoreception sensor to thereby achieve focusing.

However, since the focusing systems disclosed in the above described patents regard the center of the screen as the field of view of the sensor (detection range), in the case of a projection lens whose optical axis is shifted with respect to the center of the screen as described above, the orientation of the optical axis of the projection lens does not align with the orientation of the optical axis of the photoreception sensor. For this reason, the distance along the optical axis of the sensor is different from the distance along the optical axis of the projection lens, and as a result, it is not possible to achieve accurate focusing of the projection optical system.

SUMMARY OF THE INVENTION

It is an object of the present invention to provide a projection type image display apparatus capable of performing accurate focusing of a projection optical system using the output from a photoreception sensor even when the optical axis of the projection optical system is shifted with respect to the center of the screen.

To attain the above described object, a first aspect of the projection type image display apparatus of the present invention includes a projection optical system which projects light from an image forming element which forms an original image onto a projection surface, and a controller which controls focusing of the projection optical system based on an output signal from a photoreception sensor. The photoreception sensor receives light from the projection surface. The optical axis of the projection optical system is shifted with respect to a reference axis. The reference axis leads from the center of the original image formed on the image forming element to the center of the projected image. Then, the photoreception sensor receives light in a detection area which is proximate to and includes the position of the optical axis of the projection optical system on the projection surface.

A second aspect of the projection type image display apparatus of the present invention includes a projection optical system which projects light from an image forming element which forms an original image onto a projection surface, and a controller which performs focusing control of the projection optical system based on an output signal from a photoreception sensor. The photoreception sensor receives light from the projection surface. The photoreception sensor receives light from a detection area including a boundary between an image projection area and non-image area on the projection surface.

A third aspect of the present invention includes a projection optical system which projects light from an image forming element which forms an original image onto a projection surface, and a controller which performs focusing control of the projection optical system based on an output signal from a photoreception sensor. The photoreception sensor receives light from a detection area set on the projection surface. The photoreception sensor comprises a pair of line sensors placed apart in a base line length direction. Then, the detection area of the photoreception sensor includes one side of the projected image on the projection surface and the base line length direction is substantially orthogonal to the one side.

A fourth aspect of the present invention includes a projection optical system which projects light from an image forming element which forms an original image onto a projection surface, and a controller which performs focusing control of the projection optical system based on an output signal from a photoreception sensor. The photoreception sensor receives light from a detection area set on the projection surface. The photoreception sensor comprises a pair of line sensors placed apart in a base line length direction. The optical axis of the projection optical system is shifted with respect to a reference axis. The reference axis leads from the center of the original image formed on the image forming element to the center of the projected image. The detection area of the photoreception sensor includes the side closest to the optical axis of the projection optical system among circumferential sides of the projected image. The base line length direction of the pair of line sensors is substantially orthogonal to the side of the projected image closest to the optical axis of the projection optical system.

A fifth aspect of the present invention includes an element which forms an image, and a projection optical system which obliquely projects the image formed on the element onto a projection surface. The optical axis of the projection optical system is inclined with respect to the projection direction of the image. Further, it includes a photoreception sensor which receives light from the projection surface in a direction substantially parallel to the optical axis of the projection optical system.

A sixth aspect of the present invention includes an element which forms an image, and a projection optical system which obliquely projects the image formed on the element onto a projection surface. The optical axis of the projection optical system is inclined with respect to the projection direction of the image. Further, it includes a photoreception sensor which receives light from the projection surface. A first angle formed by the photoreception direction of the photoreception sensor with respect to the optical axis of the projection optical system is smaller than a second angle formed by the photoreception direction of the photoreception sensor with respect to the projection direction of the image.

Features of the projection type image display apparatus of the present invention will become more apparent from the following detailed description of a preferred embodiment of the invention with reference to the drawings.

DETAILED DESCRIPTION OF THE PREFERRED EMBODIMENTS

With reference now to the attached drawings, an embodiment of the present invention will be explained below.

Figure 1:
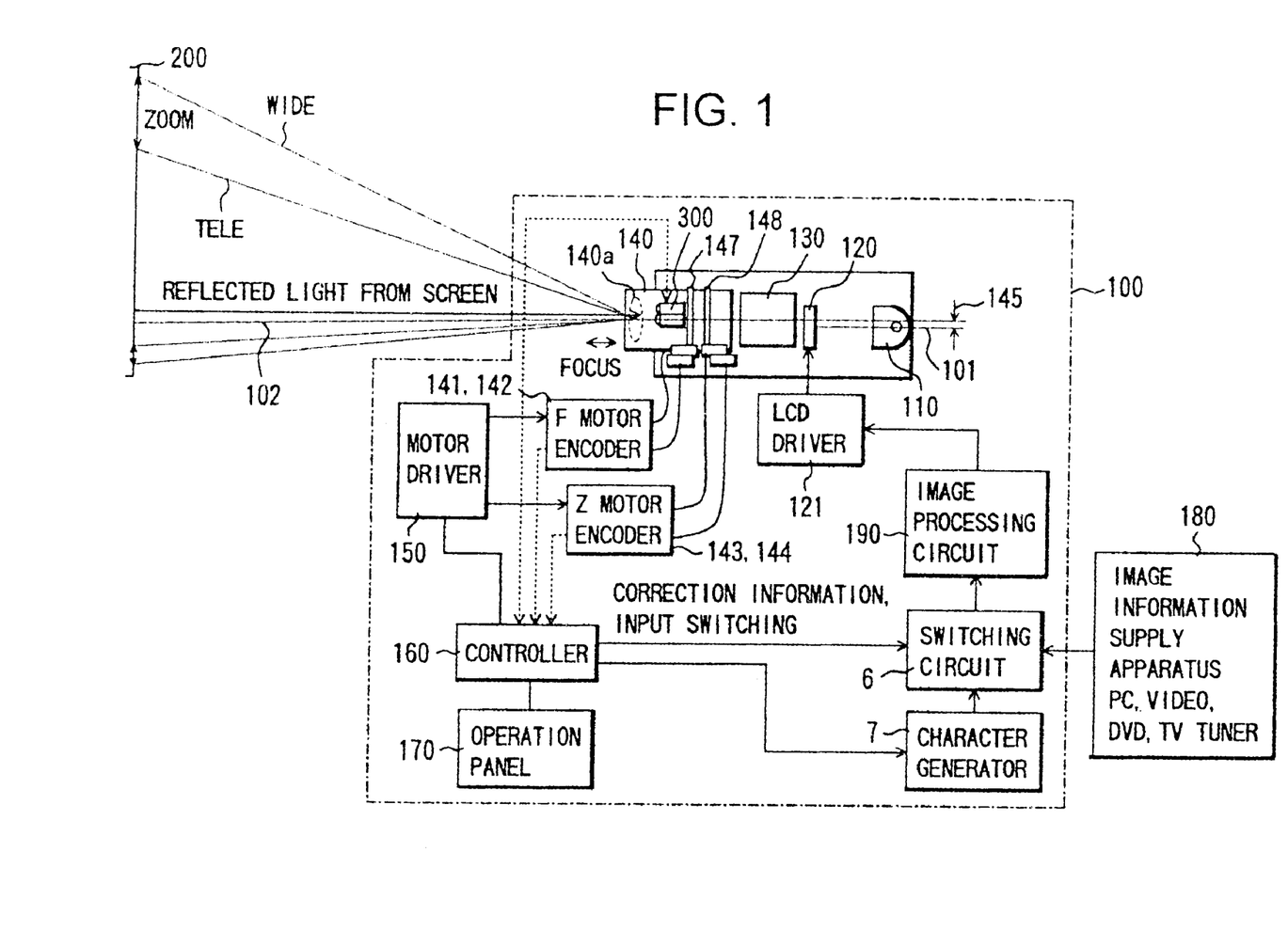
FIG. 1 is a block diagram of a liquid crystal projector provided with an AF function, which is Embodiment 1 of the present invention.

FIG. 1 shows a structure of a three-plate type liquid crystal projector (projection type image display apparatus) provided with an AF, which is Embodiment 1 of the present invention.

In FIG. 1, reference numeral 100 denotes a liquid crystal projector. Reference numeral 110 denotes a light source, 120 denotes a transmission type liquid crystal display panel, 130 denotes a cross dichroic prism, 140 denotes a zoom projection lens (projection optical system), 150 denotes a motor driver, 160 denotes a controller made up of a microcomputer, 170 denotes an operation panel, 180 denotes an image signal supply apparatus such as a personal computer, video, DVD player, TV tuner, etc., 190 denotes an image processing circuit, 200 denotes a screen and 300 denotes a passive AF sensor (photoreception-sensor).

The basic structure of the above described projector 100 is a general structure as a three-plate type liquid crystal projector. That is, three transmission type liquid crystal display panels 120 (only one channel is shown in the figure) are used and illumination light from the light source (high-pressure mercury lamp, metal halide lamp, xenon lamp, etc.) 110 is separated into color light components of three-channels; red R, green G and blue B to illuminate three liquid crystal display panels 120.

The liquid crystal display panel 120 is driven by an LCD driver 121 based on an image signal supplied from the image signal supply apparatus 180 and displays an original image of each channel corresponding to the image signal. Then, when the separated color light components are introduced into these liquid crystal display panels 120, these light components are modulated according to the original image and emerged from the liquid crystal display panels 120.

The color light components that have passed through the respective liquid crystal display panels 120 are color-combined by the cross dichroic prism 130 in such a way that their optical axes are aligned with one another and enlarged and projected onto the screen 200 through the projection lens 140.

The optical axis 102 of the projection lens 140 is shifted upward (rises) with respect to the optical axis 101 of the illumination system and the liquid crystal panels 120 as indicated by reference numeral 145. In this way, the lens optical axis 102 is shifted (the optical axis 102 of the projection lens 140 is shifted with respect to the reference axis leading from the center of the original image formed on the liquid crystal display panel 120 to the center of the projected image). This causes the image projected onto the screen 200 to be projected upward with respect to the lens optical axis 102. Therefore, when projection is performed from the projector placed on a desk, it is possible to reduce screen vignetting by the desk itself.

The projection lens 140 is a zoom lens and zooming causes the projection field angle to be changed on the screen 200 from the telephoto end to the wide-angel end as indicated by the arrow. The distance from the optical axis 102 of the projection lens 140 to the screen end is enlarged or reduced in proportion to the magnification varying rate by zooming, and therefore the movement of the screen end on the lower side close to the optical axis 102 is relatively small.

On the outer circumference of the projection lens 140, a focus operation ring 147 and a zoom operation ring 148 each having a circumferential gear portion are provided. Focusing and field angle adjustment are performed by rotating these operation rings 147 and 148, and thereby driving a focus lens 140a and a variator lens (not shown) making up part of the projection lens 140 in the direction of the optical axis.

The circumferential gear portions of these two operation rings 147 and 148 are engaged with output pinions of a focusing motor 141 and zooming motor 143 which are geared motors forming one piece with a deceleration unit (not shown) for power driving. In this way, the operation rings 147 and 148 are electrically driven through the outputs of the motors 141 and 143, and the focus lens 140a and variator lens are driven. It is also possible to perform zooming and focusing through manual operations of the focus operation ring 147 and zoom operation ring 148.

Potentiometer type rotary encoders 142 and 144 are connected to the circumferential gear portions of the operation rings 147 and 148 to detect their absolute positions (that is, absolute positions of the focus lens 140a and variator lens) through pinion gears. From the rotary encoders 142 and 144, signals indicating the position of the current focus lens 140a and the position of the variator lens are output to the controller 160.

The focusing motor 141 and zooming motor 143 are driven and controlled by the controller 160 through the motor driver 150.

An image to be projected by this projector is selected from among those based on the image signal from the image signal supply apparatus 180, those based on the image signal from the character generator 7 used to display operation modes, etc., often provided for a latest projector or those based on the image signal in a memory (not shown) by a switching circuit 6. The selected image signal is subjected to resolution conversion, gamma processing, non-interlace processing, etc., according to the type of the image signal by the image processing circuit 190 and displayed on the liquid crystal display panels 120 after passing through an LCD driver 121 for RGB channels.

The operation panel 170 is placed on the outer surface of the projector 100 and a group of switches for power ON/OFF, selection of the supply source of a projected image (that is, original image), power zooming operation, power focusing operation, autofocus ON/OFF operation are concentrated thereon.

Figure 2:
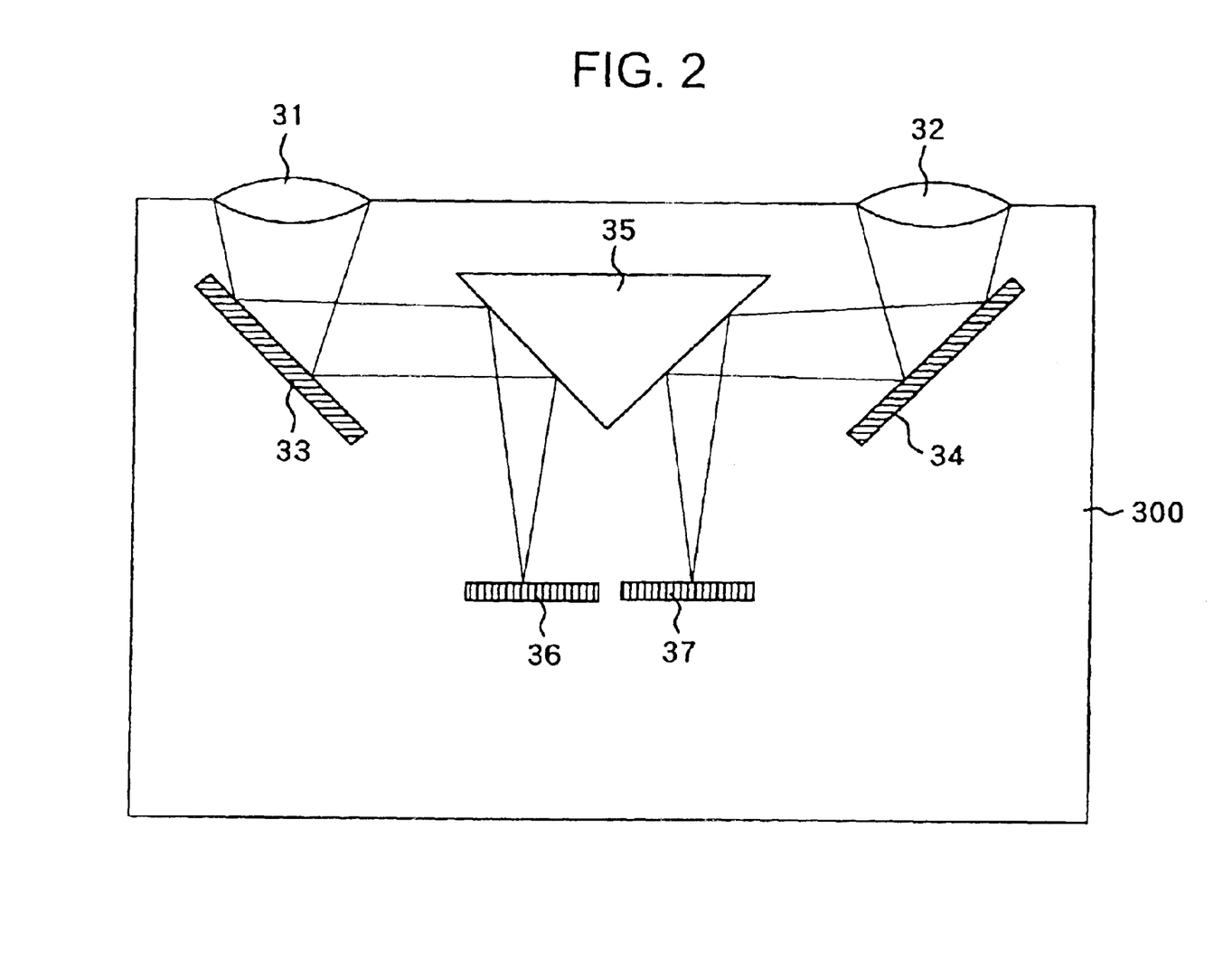
FIG. 2 is a block diagram of an AF sensor section of the projector shown in FIG. 1.

FIG. 2 shows a schematic structure example of the passive AF sensor 300. The passive AF sensor 300 receives reflected light from a detection area (field of view) including the lower side of the area where the image is projected on the screen 200 (image projection area), that is, the boundary between the image projection area and the non-image area where no image is projected.

More specifically, the passive AF sensor 300 is designed to receive the above described reflected light from a pair of line sensor A 36 and line sensor B 37 through a pair of lenses 31 and 32 placed apart by a predetermined distance which corresponds to a base line length, a pair of mirrors 33 and 34, and further through the reflecting surface of a prism 35.

Then, the passive AF sensor 300 is placed near the projection lens 140 and its detection area set in such a way as to cross over part of the lower side of the image projection area on the screen 200 as will be described later using FIG. 5. Furthermore, the base line length direction E of the passive AF sensor 300 extends in vertical direction and is substantially orthogonal to the lower side of the image projection area. Furthermore, the central axis of the field of view of the passive AF sensor 300 is substantially parallel to the optical axis 102 of the projection lens 140.

Placing the passive AF sensor 300 inside the projector 100 in this way reduces waste from the standpoint of space efficiency because the sensor 300 is generally structured in a substantially prism shape.

Furthermore, the detection area of the passive AF sensor 300 is set within an area outside the central area of the projected image and an area proximate to the optical axis 102, where is mostly centered on the position of the optical axis 102 of the projection lens 140, on the projected image. The area proximate to the optical axis 102 is a place where a white color of the highest brightness is easily obtained in the total projected image. In this way, high contrast is obtained through the reflected light from the detection area as will be described later.

Figure 3:
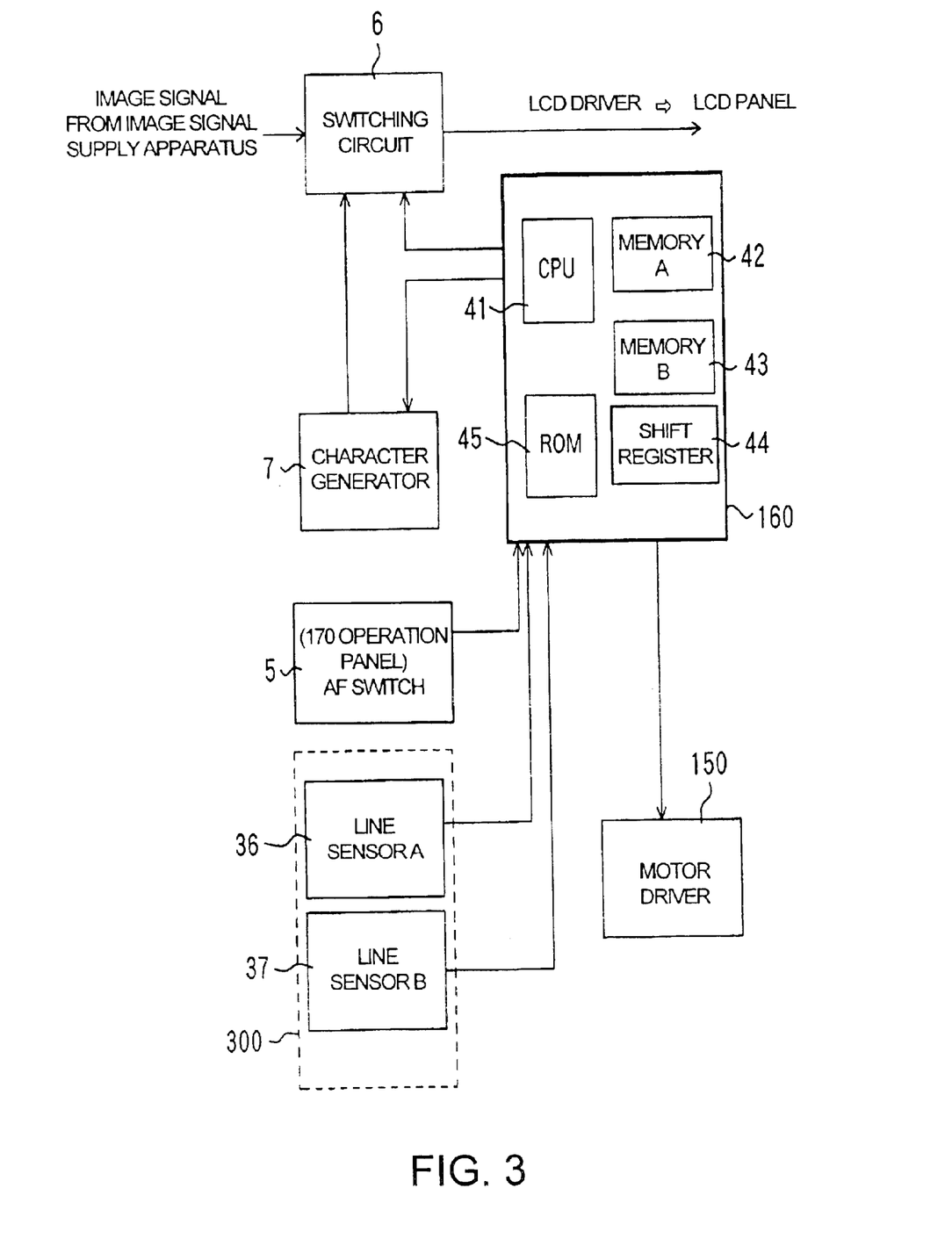
FIG. 3 is a schematic block diagram of an AF control circuit of the projector shown in FIG. 1.

FIG. 3 shows a schematic structure of the circuit related to AF control. The controller 160 not only controls the entire projector system but also controls AF. This controller 160 includes a CPU 41 as well as a memory A 42, memory B 43, shift register 44 and ROM 45.

Here, the memory A 42 and memory B 43 store image signals photoelectrically converted by the line sensor A 36 and line sensor A 37 of the above described passive AF sensor 300 individually.

The shift register 44 is designed to be fed with, for example, image data of the memory A 42 and this input image data is sequentially shifted. Then, the CPU 41 compares the data of this shift register 44 and data of the memory B 43 and detects a match between both data. Further, the CPU41 compares the amount of shift at this time with the content of the ROM 45, calculates the distance up to the screen 200 and sends the output with which the focusing lens 140a is to be driven to the motor driver 150.

The ROM 45 here stores the relationship between the above amount of shift and distance from the screen 200 in a table form. The system can also be structured in such a way that a plurality of this table data are provided, data can be selected from the table using temperature as a parameter. A temperature sensor (not shown) is added near the passive AF sensor 300 in the projector 100 so that focusing variations due to temperature is reduced by table selection. This makes it possible to secure good AF accuracy in the projector where temperature rises are likely to occur.

Reference numeral 5 denotes an AF switch and is provided on the operation panel 170. The operation of this AF switch 5 is sent to the switching circuit 6 through the controller 160. This switching circuit 6 responds to the operation of the AF switch 5 and switches the image signal which is the origin of the original image which is displayed on the liquid crystal display panels 120 from a video signal to a content of the projected image using a hardware background generation function of the character generator 7.

In this case, the character generator 7 sends image signals indicating full white images without any non-background character display pattern, full gray image or image signal indicating an image for AF detection equivalent to the full gray image to the LCD driver 121 according to the instruction of the controller 160. Thereby an original image corresponding to the abovedescribed image for AF detection is displayed on the liquid crystal display panels 120.

Then, the AF operation at the projector 100 in such a structure will be explained. This AF operation is preferably performed before a normal video image is projected and displayed.

First, the AF switch 5 provided on the operation panel 170 is operated and when the switching circuit 6 is changed to a state in which the character generator 7 is selected, the controller 160 outputs the content of the character generator 7 to the LCD driver 121. This causes the abovedescribed original image for AF detection to be displayed on the liquid crystal display panel 120 and an AF detection image to be displayed on the screen 200.

Here, the optical axis 102 of the projection lens 140 is shifted to the position at which the ratio of upper size to the lower size within the effective display area of the liquid crystal display panel 120 is 1 to 19, and therefore the projected image on the screen 200 is shifted with respect to the optical axis 102 of the projection lens 140 so that the ratio of the upper size to the lower size is 19 to 1. And the projected image is projected with an apparent angle of elevation so that there is no distortion.

The field of view of the passive AF sensor 300 is set to approximately 10 degrees in the length direction of the base line and the lower side of the projection image is included in the detection area of the sensor 300 as described above.

On the boundary between "the image projection area" and "non-image area" outside the image projection area on this screen 200, for example, "an area with a full white image with maximum brightness that can be projected" exists adjacent to "an area with lower brightness than the case where a black level image is projected".

Here, the black level image is brighter than the non-image area because this is a general characteristic of the transmission type liquid crystal display panels 120 and there is inevitably leakage of light in a totally closed state. Furthermore, flare of the projection lens 140 or leakage of light around the dichroic prism 130, etc., inevitably increases brightness of the black level image.

On the other hand, since the lower side of the projected image is located near the optical axis 102 of the projection lens 140, this is the location where the white with the highest brightness is easily obtained within the entire projected image.

Thus, when a sensor output is obtained with this position included in the detection area of the sensor 300, the above-described boundary shows the maximum contrast that can be created through projection by the projector. On the other hand, when the projected image is a full gray image, the brightness in the non-image area is low, and therefore it is possible to obtain sufficiently high contrast in the detection area of the sensor 300.

Furthermore, even when the projection lens 140 is zoomed between the telephoto end and wide-angle end, a positional variation of the lower side of the projected image is small as described above, and therefore the above-described boundary is always included in the detection area of the sensor 300 without the need to adjust the center (optical axis) in the base line length direction of the detection area of the sensor 300 upward or downward.

Thus, the reflected light from the detection area of the sensor 300 incident on the passive AF sensor 300 is received by the line sensor A 36 and line sensor B 37 through the lenses 31 and 32, mirrors 33 and 34 and prism 35 shown in FIG. 2. Then, the image signals photoelectrically converted by the respective pixels of these line sensor A 36 and line sensor B 37 are stored in the memory A 42 and memory B 43 of the controller 160.

Figure 4:
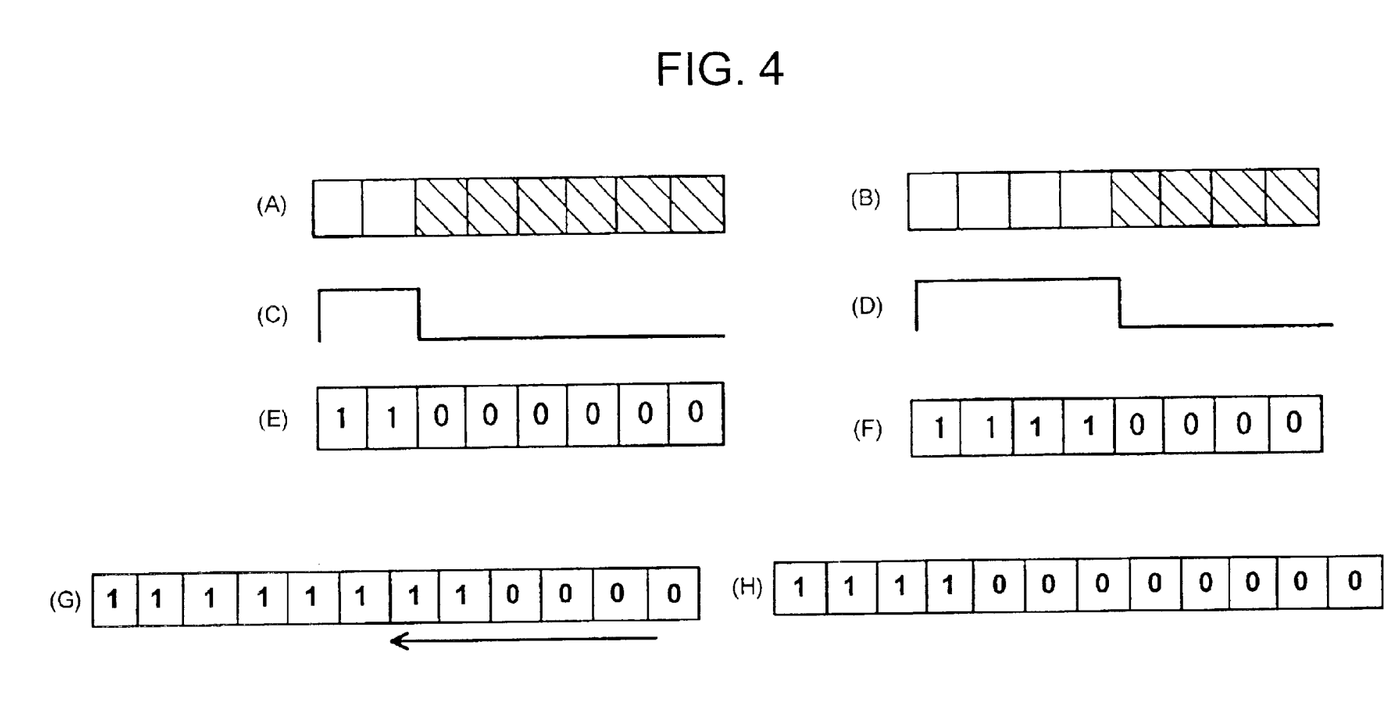
FIG. 4 illustrates a two-image correlation of the AF sensor section shown in FIG. 2.

FIG. 4 shows a two-image correlation formed on the above described line sensor A 36 and line sensor B 37.

In the abovedescribed case, images in the detection area of the sensor 300 are formed in the line sensor A 36 and line sensor B 37 as shown in FIGS. 4(A) and 4(B). From the pixel group making up each line sensor, signals shown in FIGS. 4(C) and 4(D) are output. The memory A 42 and memory B 43 store image data shown in FIGS. 4(E) and 4(F) corresponding to the output signals shown in FIGS. 4(C) and 4(D).

Then, the data of the memory A 42 of this image data is input to the shift register 44 as shown in FIG. 4(G) and the content of the shift register 44 is shifted sequentially in the direction indicated by the arrow in the figure.

In this condition, the CPU 41 compares the data pattern of the shift register 44 with the data pattern of the memory B 43 (see FIG. 4(H)). When a match between both data pieces is detected, the amount of shift at this time is compared with the storage content of the ROM 45 and the distance from the screen 200 is calculated.

Then, when this distance data is output to the motor driver 150, the focusing lens 140a is driven and focusing is performed.

Thus, by selecting an image created by hardware beforehand, projecting this image onto the screen 200 and enabling AF control, it is possible to improve the focusing accuracy drastically without the need to waste extra memory and reduce burden on the cost.

The abovedescribed embodiment has described the case where an image for AF detection is projected and AF control is performed, but it is likewise possible to perform AF control even when images are projected by image signals from the image signal supply apparatus 180 such as a normal video image, etc.

Then, applying this concept to a video projector and an AV system that includes the video projector can improve performance of the entire system and increase the product quality of the system. Furthermore, since the focusing accuracy can be maintained even when the projection lens is zoomed, it is possible to use a vari-focal lens, etc., with a simple lens structure and easy to miniaturize.

Figure 5:
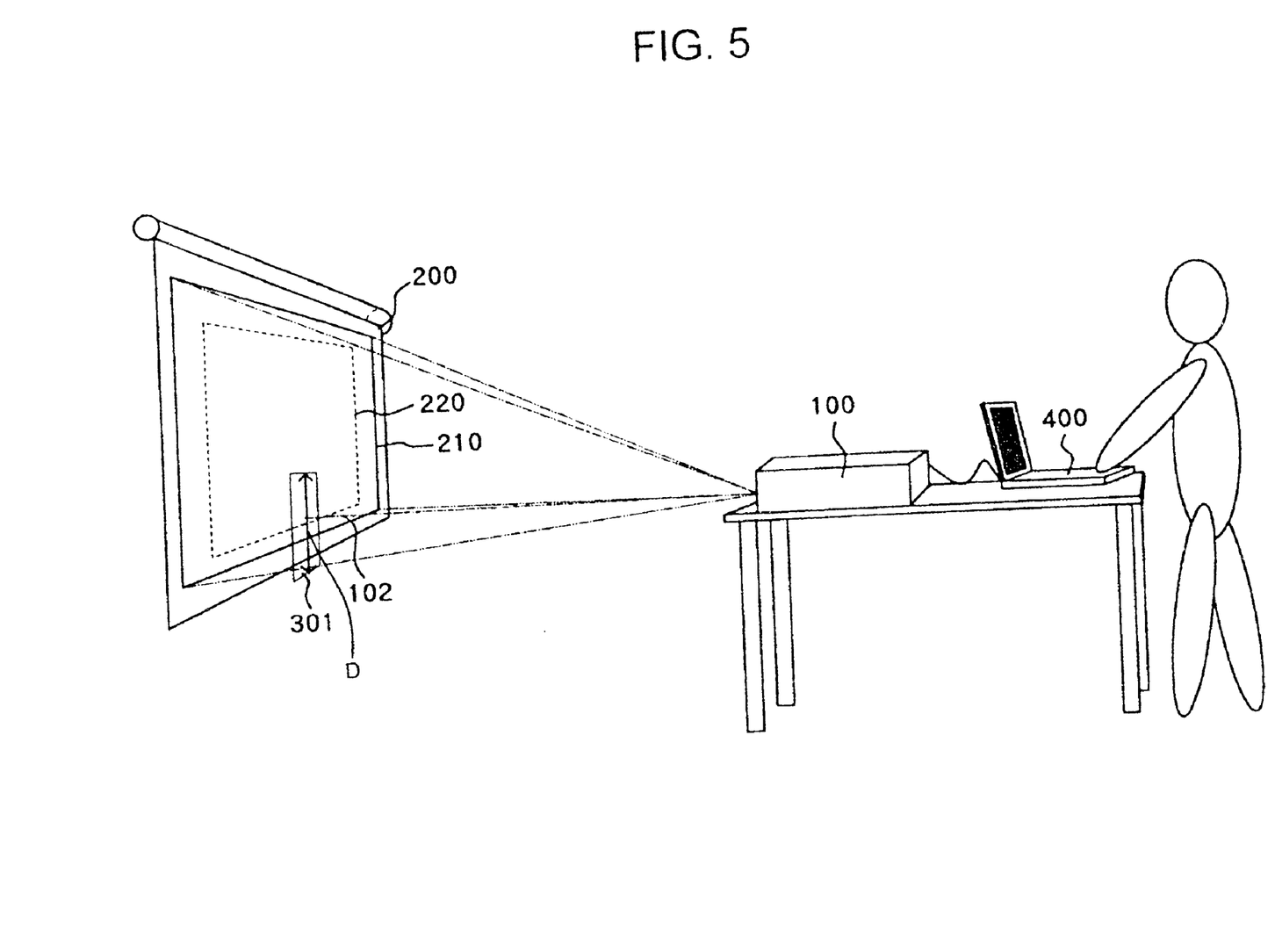
FIG. 5 illustrates an operation state of an image display system using the liquid crystal projector according to Embodiment 1 above.

FIG. 5 shows a situation in which an image display system using the abovedescribed liquid crystal projector.

The projector 100 placed on a desk and opposed to a roll-up type screen 200 is connected to a notebook personal computer 400 as an image signal supply apparatus and projects an image on the notebook personal computer 400 onto a roll-up type screen 200.

Reference numeral 301 in the figure denotes the detection area of the passive AF sensor 300. Though the detection area 301 in the figure is illustrated for explanation, it is actually invisible. The base line length direction E which extends in the vertical direction of the passive AF sensor 300 is substantially orthogonal to the lower side of the projected image (boundary between the image projection area and non-image area on the screen 200). The field of view of the sensor 300 is approximately 10 degrees in the vertical direction and its optical axis is substantially parallel to the optical axis 102 of the projection lens 104.

Even if the projection field angle of the projector 100 is changed between the wide-angle state (shown by the projected image 210 in the figure) and telephoto state (shown by the projected image 220 in the figure) in this state, the lower side of the projected image is always included in the detection area of the sensor 300.

This basic system is combined with various image signal supply apparatuses, AV switcher and recording device, etc., to construct a presentation system or TV conference system, etc. Using the projector 100 according to the present invention allows users who are not familiar with the system to easily set up the system.

(Embodiment 2)

The above described Embodiment 1 has described the case where the lower side of a projected image (boundary between the image projection area and non-image area on the screen 200) is included in the detection area of the passive AF sensor 300. However, the setting of the detection area of the sensor 300 of the present invention is not limited to this.

Figure 6:
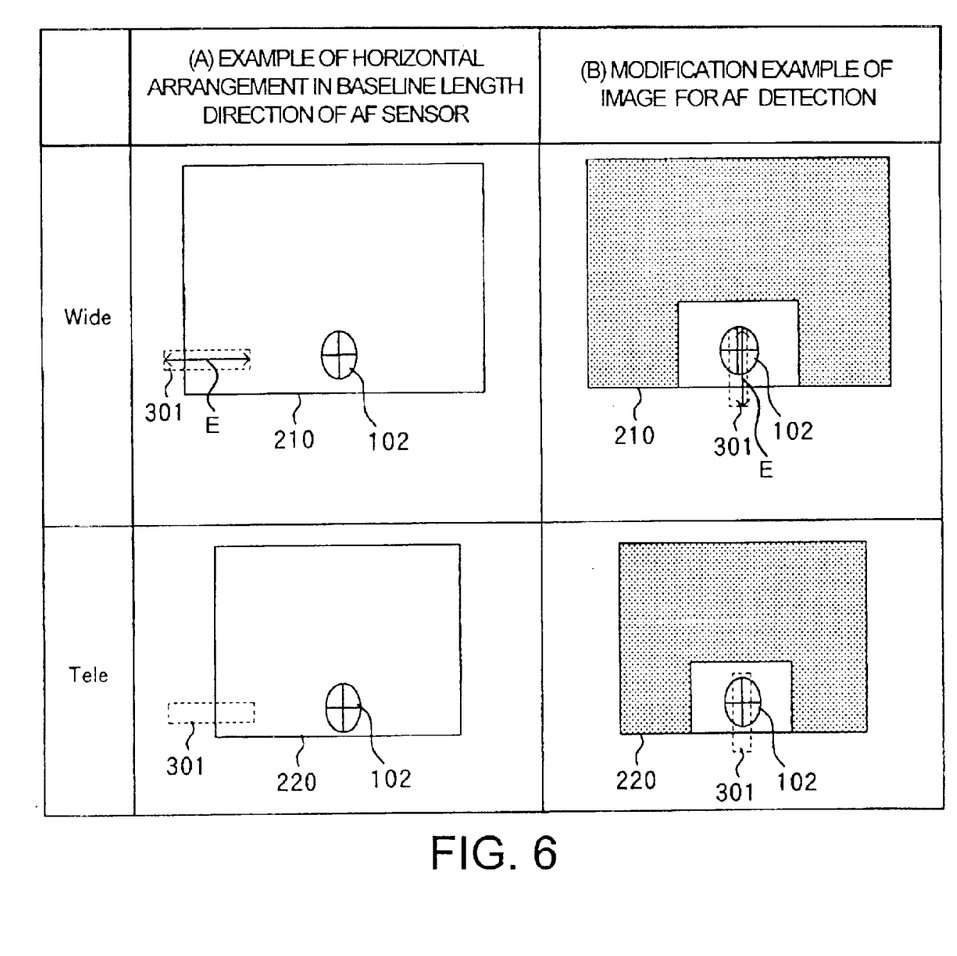
FIG. 6 illustrates a relationship between a projected image and a field of view of an AF sensor in the liquid crystal projector provided with the AF function, which is Embodiments 2 and 3 of the present invention.

FIG. 6(A) shows a setting of the detection area of the passive AF sensor 300 of the liquid crystal projector, which is an Embodiment 2 of the present invention. In this embodiment, the AF sensor 300 is rotated 90 degrees with respect to the case of Embodiment 1 and its vertical direction is kept parallel to the optical axis 102 of the projection lens and it is slightly inclined leftward. This allows the lower part of the left side of the projected image to be included in the detection area 301 of the sensor 300.

The upper half of FIG. 6(A) shows a relationship between the projected image and detection area of the sensor 301 in a wide-angle state and the lower half shows a relationship between the projected image and detection area of the sensor 301 in a telephoto state. In both figures, the left side of the projected image is included in the detection area 301 of the sensor 300 in these zooming states. The base line length direction E of the AF sensor 300 is substantially orthogonal to the left side of the projected image.

During autofocusing, a full white image, etc., is projected onto the screen as in the case of the abovedescribed Embodiment 1 and the detection area of the sensor 300 including high contrast boundary with the non-image (black level) area is used.

In this embodiment, when an inclination angle of the optical axis of the sensor 301 with respect to the optical axis of the projection lens is θ, distance data based on an output of the sensor 300 is D and the actual distance up to the screen is L. Then, $$L = D \cos \theta$$

This relationship is preferably stored in a distance data table and used for correction or the relationship is corrected by calculations to perform AF control and improve the accuracy of focusing.

(Embodiment 3)

FIG. 6(B) shows a setting of the detection area of the passive AF sensor 300 in a liquid crystal projector which is Embodiment 3 of the present invention. In this embodiment, a full screen image is not used as the projected image during autofocusing and a minimum partial image (white plain image, etc.) necessary for securing the same detection area 301 of the sensor 300 as those of the abovedescribed embodiments is projected onto the screen.

In both a wide-angle state (upper half in the figure) and telephoto state (lower half in the figure), the detection area 301 of the sensor 300 is set so that the lower side (boundary between the image projection area and non-image area) of the projected image is included in this embodiment, too. The base line length direction E of the AF sensor 300 is substantially orthogonal to the lower side of the projected image.

The position of the partial image on the screen is not limited to the position shown in FIG. 6(B). It can be any position if it is at least a position allowing the detection area of the sensor including the boundary between the image projection area and non-image area to be set. However, as described in Embodiment 2, it is preferable to perform correction or calculation due to inclination of the optical axis of the sensor 301 with respect to the optical axis of the projection lens.

(Embodiment 4)

The abovedescribed embodiments have described the case where the detection area of the passive AF sensor 300 is set so that the boundary between the image projection area and non-image area is included and AF is performed using contrast at the boundary. However, the boundary between the image projection area and non-image area need not be included in the detection area if a geometrical chart image included in the detection area is projected onto the screen.

In this case, the highest brightness is obtained in the detection area proximate to the optical axis 102 of the projection lens 140 among the projected images as described above, and therefore it is possible to obtain high contrast for the chart image displayed here. Therefore, it is possible to perform accurate AF control of the projection lens 104 as in the case of the abovedescribed embodiment.

As described above, the abovedescribed embodiments provide a projection type image display apparatus having a so-called shift projection optical system whose optical axis is shifted with respect to the reference axis leading from the center of the original image formed on the image forming element to the center of the projected image, wherein a focusing state is detected according to a passive system using the reflected light from the area peripheral to the optical axis (area proximate to the optical axis) including the position where brightness is most likely to increase on the projection surface, and can thereby perform favorable autofocusing of the projection optical system in a simple structure without the need to provide a movable section for the photoreception detection section.

Furthermore, the abovedescribed embodiments detect a focusing state according to a passive system for a detection area including the boundary between the image projection area in which a high brightness image is projected on the projection surface and the non-image area where no image is projected, that is, a detection area having extremely high contrast, and can thereby perform favorable autofocusing of the projection optical system in a simple structure without the need to provide a movable section for the photoreception sensor section.

When the projection field angle of the projection optical system can be changed (zoomed), by setting the detection area of the photoreception sensor so that it includes the abovedescribed boundary over the entire zooming range, it is possible to perform favorable detection of the focusing state and autofocusing in the entire zooming range without being affected by variations in size of the projected image by zooming.

Furthermore, when the photoreception detecting sensor is structured of a pair of line sensors placed apart in the base line length direction, it is preferable to provide this photoreception detecting sensor in such a way that the base line length direction of the sensor is substantially orthogonal to one side of the projected image, which is included in the abovedescribed detection area of the sensor. That is, by causing the base line length direction on which pixels of the line sensor are arranged to be substantially orthogonal to the abovedescribed boundary, it is possible to make it easier to include the abovedescribed boundary in the detection area and also make assembly/adjustment easier.

Then, when the optical axis of the projection optical system is shifted with respect to the path (reference axis) of the central principal ray from the center of the original image formed on the image forming element to the center of the projected image, it is preferable to provide the above described pair of line sensors so that the base line length direction of the pair of the line sensors is substantially orthogonal to the side closest to the optical axis of the projection optical system among the circumferential sides of the projected image. When the optical axis of the projection optical system is shifted with respect to the reference axis, the vicinity of the optical axis is is brighter than the center of the projected image, it is easier to obtain high contrast at the boundary and it is possible to improve the detection accuracy of the focusing state.

While preferred embodiments have been described, it is to be understood that modification and variation of the present invention may be made without departing from scope of the following claims.

What is claimed is:

1. A projection type image display apparatus comprising:
   an image forming element which forms an original image;
   a projection optical system capable of focusing, which projects light from the image forming element onto a projection surface;
   a photoreception sensor which receives light from the projection surface; and
   a controller which performs focusing control of the projection optical system based on an output signal from the photoreception sensor,
   wherein the optical axis of the projection optical system is shifted with respect to a reference axis, the reference axis leading from the center of the original image formed on the image forming element to the center of the projected image, and
   the photoreception sensor receives light from a detection area which is proximate to and includes the position of the optical axis of the projection optical system on the projection surface.

2. The projection type image display apparatus according to claim 1, wherein the detection area is set substantially centered on the position of the optical axis of the projection optical system on the projection surface.

3. A projection type image display apparatus comprising:
an image forming element which forms an original image;
a projection optical system capable of focusing, which projects light from the image forming element onto a projection surface;
a photoreception sensor which receives light from the projection surface; and
a controller which performs focusing control of the projection optical system based on the output signal from the photoreception sensor,
wherein the photoreception sensor receives light from a detection area including a boundary between an image projection area and a non-image area on the projection surface.

4. The projection type image display apparatus according to claim 3, wherein the projection field angle of the projection optical system is changeable, and
the detection area of the photoreception sensor is set so as to include the boundary in the entire changeable range of the projection field angle.

5. The projection type image display apparatus according to claim 3, wherein the optical axis of the projection optical system is shifted with respect to a reference axis, the reference axis leading from the center of the original image formed on the image forming element to the center of the projected image.

6. The projection type image display apparatus according to claim 3, wherein the apparatus projects a full white image, a full gray image or an image which corresponds to them when the controller performs focusing control of the projection optical system.

7. The projection type image display apparatus according to claim 6, wherein the full white image, full gray image or image which corresponds to them is formed by using a hardware function of a character generator.

8. A projection type image display apparatus comprising:
an image forming element which forms an original image:
a projection optical system capable of focusing, which projects light from the image forming element onto a projection surface;
a photoreception sensor which receives light from the projection surface; and
a controller which performs focusing control of the projection optical system based on an output signal from the photoreception sensor,
wherein the photoreception sensor comprises a pair of line sensors arranged apart in a base line length direction,
the detection area of the photoreception sensor includes one side of the projected image, and
the base line length direction is substantially orthogonal to the one side.

9. A projection type image display apparatus comprising:
an image forming element which forms an original image;
a projection optical system capable of focusing, which projects light from the image forming element onto a projection surface;
a photoreception sensor which receives light from a detection area set on the projection surface; and
a controller which performs focusing control of the projection optical system based on an output signal from the photoreception sensor,
wherein the photoreception sensor comprises a pair of line sensors arranged apart in a base line length direction,
the optical axis of the projection optical system is shifted with respect to a reference axis, the reference axis leading from a center of the original image formed on the image forming element to the center of the projected image,
the detection area of the photoreception sensor includes a side closest to the optical axis of the projection optical system among circumferential sides of the projected image, and
the base line length direction of the pair of line sensors is substantially orthogonal to the side closest to the optical axis of the projection optical system.

10. A projection type image display system comprising:
the projection type image display apparatus according to claim 1; and
an image signal supply apparatus which supplies an image signal for displaying an original image on the image forming element to the projection type image display apparatus.

11. A projection type display apparatus comprising:
an element which forms an image;
a projection optical system which obliquely projects the image formed on the element onto a projection surface, the optical axis of the projection optical system being inclined with respect to the projection direction of the image; and
a photoreception sensor which receives light from the projection surface in a direction substantially parallel to the optical axis of the projection optical system.

12. The projection type display apparatus according to claim 11, further comprising a processor which obtains the distance from the projection surface based on an output from the photoreception sensor.

13. The projection type display apparatus according to claim 11, further comprising a controller which performs focusing of the projection optical system based on an output from the photoreception sensor.

14. The projection type display apparatus according to claim 13, further comprising a temperature sensor which measures temperature,
wherein the controller performs focusing of the projection optical system based on the measurement result of the temperature sensor.

15. A projection type display apparatus comprising:
an element which forms an image;
a projection optical system which obliquely projects the image formed on the image forming element onto a projection surface, the optical axis of the projection optical system being inclined with respect to the projection direction of the image; and
a photoreception sensor which receives light from the projection surface,
wherein a first angle formed by the photoreception direction of the photoreception sensor with respect to the optical axis of the projection optical system is smaller than a second angle formed by the photoreception direction of the photoreception sensor with respect to the projection direction of the image.

* * * * *